United States Patent [19]

Ide et al.

[11] 4,041,106

[45] Aug. 9, 1977

[54] VINYL CHLORIDE POLYMER COMPOSITION MODIFIED FOR TRANSPARENCY, IMPACT AND THERMAL RESISTANCE

[75] Inventors: Fumio Ide; Kazuo Kishida; Norihisa Osaka, all of Otake, Japan

[73] Assignee: Mitsubishi Rayon Co., Ltd., Tokyo, Japan

[21] Appl. No.: 685,145

[22] Filed: May 11, 1976

[30] Foreign Application Priority Data

May 15, 1975    Japan ................................ 50-58389

[51] Int. Cl.² ................. A43B 13/04; C08L 51/06; C08F 6/24
[52] U.S. Cl. ................... 260/876 R; 260/23 XA; 260/23.7 M; 260/23.7 R; 260/890; 260/892
[58] Field of Search ............ 260/876 B, 876 R, 890, 260/892

[56] References Cited

U.S. PATENT DOCUMENTS

| | | | |
|---|---|---|---|
| 3,644,249 | 2/1972 | Ide et al. | 260/23.7 R |
| 3,644,250 | 2/1972 | Ide et al. | 260/23.7 R |
| 3,651,175 | 3/1972 | Ide et al. | 260/876 R |
| 3,678,133 | 7/1972 | Ryan | 260/876 R |
| 3,793,406 | 2/1974 | Bortnick et al. | 260/884 |
| 3,833,683 | 9/1974 | Dickie et al. | 260/836 |
| 3,833,686 | 9/1974 | Grochowski et al. | 260/876 R |
| 3,842,144 | 10/1974 | Tonaka et al. | 260/876 R |
| 3,843,753 | 10/1974 | Owens | 260/876 R |
| 3,879,494 | 4/1975 | Milkovich et al. | 260/876 R |
| 3,882,198 | 9/1975 | Miller | 260/876 R X |
| 3,886,623 | 5/1975 | Tanaka et al. | 260/876 R |
| 3,899,547 | 7/1975 | Amagi et al. | 260/876 R |
| 3,928,500 | 12/1975 | Kraft et al. | 260/876 R X |
| 3,943,190 | 3/1976 | Abe et al. | 260/876 R |
| 3,959,895 | 6/1976 | Lonning | 260/876 R X |
| 3,969,431 | 7/1976 | Gallagher | 260/876 R |

*Primary Examiner*—Murray Tillman
*Assistant Examiner*—T. DeBenedictis
*Attorney, Agent, or Firm*—Armstrong, Nikaido, Marmelstein

[57] ABSTRACT

Provided are vinyl chloride polymer compositions having a composite elastomer modifier incorporated therein, whereby said polymers exhibit on excellent balance of the physical properties of thermal resistance, transparency, and impact resistance. The composite elastomer modifier is comprised of (A) 20 to 60% by weight of a graft copolymer prepared by grafting methyl methacrylate and styrene onto a butadiene rubber in a specified sequential multi-stage polymerization procedure of (B) 40 to 80% by weight of a copolymer comprised of α-methylstyrene, methyl methacrylate and acrylonitrile. The composite elastomer modifier may be prepared by either blending graft copolymer (A) with copolymer (B) or by polymerizing a monomer charge of copolymer (B) in the presence of graft copolymer (A).

6 Claims, No Drawings

VINYL CHLORIDE POLYMER COMPOSITION MODIFIED FOR TRANSPARENCY, IMPACT AND THERMAL RESISTANCE

This invention relates to vinyl chloride polymers having a composite elastomer modifier incorporated therein, whereby said polymers exhibit physical properties of improved thermal resistance, transparency, and impact resistance.

Vinyl chloride polymers are widely used because of their good balance of physical and chemical properties and economy in usage. However, unmodified vinyl chloride polymers have a few detrimental limitations because such polymers exhibit insufficient impact resistance and thermal resistance.

A variety of attempts to improve the impact resistance and thermal resistance of vinyl chloride polymers have been heretofore proposed. For example, U.S. Pat No. 3,678,132 discloses a blend of 20 to 60% by weight of a vinyl chloride polymer with 40 to 80% by weight of a modifier composition. This modifier composition comprises a polyblend comprised of (1) 40 to 80% by weight of a copolymer comprised of 30 to 80% by weight of α-methylstyrene, 5 to 50% by weight of methyl methacrylate and 3 to 30% by weight of acrylonitrile and (2) 20 to 60% by weight of a graft copolymer prepared by polymerizing a monomer mixture of 50 to 80% by weight of styrene, 20 to 50% by weight of methyl methacrylate and 0 to 30% by weight of acrylonitrile in the presence of 35 to 65% by weight of a butadiene rubber. However, this modified vinyl chloride polymer composition is not satisfactory in that its transparency and surface luster is quite poor and its impact resistance is still unsatisfactory. Therefore, there is a large limitation on the use of such modified vinyl chloride polymer.

It is a main object of the present invention to provide a modified vinyl chloride polymer composition exhibiting an excellent balance of physical properties, particularly, thermal resistance, transparency, impact resistance, and surface luster.

Other objects and advantages of the present invention will be apparent from the following description.

In accordance with the present invention there is provided a thermoplastic vinyl chloride polymer composition comprising a blend of:

I. 61 to 85 parts by weight of polyvinyl chloride and/or a copolymer comprised of no less than 80% by weight of vinyl chloride and no more than 20% by weight of at least one other copolymerizable monoethylenically unsaturated monomer, and II. 15 to 39 parts by weight of a composite elastomer composition consisting essentially of:

A. 20 to 60% by weight, based on the weight of the composite elastomer composition, of a graft copolymer consisting of (a) 15 to 45% by weight of graft monomers consisting of 30 to 70% by weight of methyl methacrylate and 30 to 70% by weight of styrene and (b) 55 to 85% by weight of a butadiene rubber, said graft copolymer being prepared by a sequential polymerization procedure of at least two stages wherein during the first stage at least part of the methyl methacrylate is polymerized in the presence of a latex of said butadiene rubber, the butadiene rubber particles dispersed therein having an average particle size of 0.10 to 0.30 micron and a refractive index of 1.530 to 1.550 as determined at 20° C, and then, in a subsequent sequential stage or stages, which can be carried out in any order, the first stage polymerizate is separately polymerized with styrene and separately polymerized with the remainder of methyl methacrylate, if any, and B. 40 to 80% by weight, based on the weight of the composite elastomer composition, of a copolymer consisting of 35 to 65% by weight of α-methylstyrene, 10 to 60% by weight of methyl methacrylate, 5 to 35% by weight of acrylonitrile and 0 to 10% by weight of at least one other copolymerizable monoethylenically unsaturated monomer.

By the term "composite elastomer composition" used herein is meant either a polyblend consisting essentially of the above-mentioned graft copolymer (A) and the above-mentioned copolymer (B) or a graft copolymer prepared by polymerizing a monomer charge of said copolymer (B) in the presence of said graft copolymer (A).

The main point of the invention resides in the composite elastomer composition comprising the graft copolymer (A) characterized particularly as being prepared by the specified sequential multi-stage polymerization procedure wherein in the first stage a part or the entire amount of the methyl methacrylate used is grafted onto the specified butadiene rubber and then, in a subsequent sequential stage or stages, which can be carried out in any order, the first stage polymerizate is separately polymerized with styrene and separately polymerized with the remainder of the methyl methacrylate, if any. The graft copolymer (A) and copolymer (B) contained in such composite elastomer composition exhibit enhanced compatibility with each other and with a vinyl chloride polymer. This appears to be a major cause for the effects desired from the invention.

The vinyl chloride polymers, which are modified by incorporating the composite elastomer composition therein, are polyvinyl chloride and copolymers comprised of no less than 80% by weight of vinyl chloride and no more than 20% by weight of at least one other copolymerizable monoethylenically unsaturated monomer. Such copolymerizable monoethylenically unsaturated monomers include, for example, monoolefins such as ethylene and propylene, vinyl alkanoates such as vinyl acetate; vinylidene halides such as vinylidene chloride; alkyl esters of an acrylic or methacrylic acid such as ethyl acrylate, 2-ethylhexyl acrylate and ethyl methacrylate; unsaturated nitriles such as acrylonitrile; alkyl vinyl ethers; and aromatic vinyl compounds such as styrene. Although the molecular weight of the vinyl chloride polymers is not critical to the aims of the invention, the vinyl chloride polymers should preferably possess a polymerization degree of 600 to 1,500 for general applications. The vinyl chloride polymers may be prepared by a suspension, an emulsion or a bulk polymerization procedure.

The graft copolymer (A) is prepared by sequentially polymerizing batches of methyl methacrylate and styrene in the presence of a butadiene rubber having the specified refractive index.

By the term "butadiene rubber" used herein is meant a copolymer consisting essentially of at least approximately 50% by weight of butadiene and not more than approximately 50% by weight of at least one copolymerizable monoethylenically unsaturated monomer. Such butadiene rubbers include, for example, copolymers such as butadiene/styrene, butadiene/α-methylstyrene and butadiene/vinyltoluene, and terpolymers such as butadiene/an aromatic vinyl compound/an acrylic acid alkyl ester, butadiene/an aromatic vinyl compound/a methacrylic acid alkyl ester and butadiene/an aromatic vinyl compound/an unsaturated nitrile. The aromatic vinyl compound, the acrylic acid alkyl ester, the methacrylic acid alkyl ester and the unsaturated nitrile, which are to be copolymerized with butadiene, include, for example, styrene, α-methylstyrene, vinyltoluene and t-butylstyrene; acrylic acid alkyl esters, the alkyl group having 2 to 18 carbon atoms; methacrylic acid alkyl esters, the alkyl group having 2 to 18 carbon atoms, and; acrylonitrile and methacrylonitrile, respectively. The comonomers used and their amounts should be determined so that the resulting butadiene rubber exhibit a refractive index of 1.530 to 1.550 as determined at 20° C. Such a refractive index is critical for producing a vinyl chloride polymer composition of the desired transparency. Suitable comonomers and their amounts may be determined by the following equation:

Refractive index (at 20° C) of butadiene rubber = $1.520[Bd] + 1.595[St] + 1.474[AAE] + 1.491[MAE]$ where [Bd], [St], [AAE] and [MAE] are weight fractions of butadiene, styrene, an alkyl ester of acrylic acid and an alkyl ester of methacrylic acid, respectively, and the total of [Bd], [St], [AAE] and [MAE] being equal to 1.0. It has been proved that the actual refractive index of the butadiene rubber is in agreement with the theoretical value calculated from the above equation when the conversion exceeds approximately 98%. Preferable butadiene rubbers consist essentially of 50 to 80% by weight of butadiene, 16 to 46% by weight of styrene and 4 to 23% by weight of n-butyl acrylate. The butadiene rubber may contain, in addition to the above-mentioned monoethylenically unsaturated monomer, a trace amount of at least one copolymerizable diethylenically unsaturated monomer such as divinylbenzene and ethylene glycol dimethacrylate.

The butadiene rubber is used in the form of a latex which may be prepared by known emulsion polymerization procedures. The particles of the butadiene rubber dispersed in the latex should possess an average particle size of 0.10 to 0.30 micron, preferably 0.15 to 0.25 micron. When the particle size is smaller than 0.10 micron, the resulting vinyl chloride polymer composition possesses good transparency but is poor in impact resistance. In contrast, when the particle size exceeds 0.30 micron, the resulting vinyl chloride composition becomes poor in transparency. The butadiene rubber latex of the desired particle size can be obtained by known emulsion polymerization procedures. The particle size may be controlled by varying the amount of an emulsifier. If the particle size of the latex formed by said polymerization procedure is smaller than 0.10 micron as cited in the above-mentioned range, the particle size may be magnified to the desired size by treating the latex with an agglomerating agent such as a n-butyl acrylate/copolymer and salts as sodium chloride and sodium sulfate, thereby to agglomerate the particles.

The amount of the butadiene rubber present in the graft copolymer (A) should be 55 to 85% by weight based on the weight of the graft copolymer (A). When the amount of the butadiene rubber exceeds that of the upper limit, the graft efficiency is reduced. Consequently, the resulting vinyl chloride polymer composition becomes poor in surface luster although it exhibits good physical properties of transparency, impact resistance and thermal resistance. In contrast, when the amount of the butadiene rubber is less than that specified by the lower limit, the resulting vinyl chloride polymer composition becomes poor in thermal resistance although it is superior in surface luster.

A monomer charge to be grafted onto the butadiene rubber consists of 30 to 70% by weight of methyl methacrylate and 30 to 70% by weight of styrene. When the relative amount of styrene to methyl methacrylate is too large, the vinyl chloride polymer composition becomes tinged with a blue color and also becomes poor in transparency. In contrast, when the relative amount of styrene to methyl methacrylate is too small, the vinyl chloride polymer composition becomes tinged with a yellow color and also becomes poor in transparency as well as in impact resistance.

In the graft copolymerization, styrene and methyl methacrylate should be incorporated into the reaction phase separately and sequentially in two or more stages. That is, the two monomers must not be incorporated simultaneously, i.e., as a mixture. If these monomers are incorporated in the form of a mixture, the resulting vinyl chloride composition is reduced particularly in surface luster as well as in transparency. The other physical properties such as impact strength and processability also are reduced. The order in which batches of the two monomers are added to the reaction phase is critical. That is, a part or the entire amount of methyl methacrylate must be added in the first stage. However, in the subsequent sequential stage or stages, the remainder of the methyl methacrylate, if any, and styrene may be added to the reaction phase in any predetermined order, provided that one or more batches of the remainder of the methyl methacrylate and one or more batches of styrene are added separately and sequentially. Preferable are the sequential two-stage polymerization procedure wherein methyl methacrylate and styrene are sequentially polymerized in this order and the sequential three-stage polymerization procedure wherein a part of methyl methacrylate, styrene and then the remainder of the methyl methacrylate are sequentially polymerized in this order.

If a part or the entire amount of styrene is added, during the first stage, the resulting vinyl chloride polymer composition is poor particularly in processability as well as in thermal resistance (softening point) and transparency. It is presumed that the graft copolymer (A) of the invention, i.e., prepared by grafting during the first stage at least part of the methyl methacrylate onto the butadiene rubber, exhibits improved compatibility with the copolymer (B) and the vinyl chloride polymer, and consequently, the resulting vinyl chloride composition exhibits the desired properties.

The copolymer (B) consists of 35 to 65% by weight of α-methylstyrene, 10 to 60% by weight of methyl methacrylate, 5 to 35% by weight of acrylonitrile and 0 to 10% by weight of at least one other copolymerizable monoethylenically unsaturated monomer, all based on the weight of the copolymer (B). When the amount of α-methylstyrene is less than 35% by weight, the resulting composition is not satisfactory in thermal resistance. In contrast, when said amount exceeds 65% by weight, the rate of polymerization decreases and a long polymerization time is required for obtaining the desired conversion, i.e., a conversion of 95% or more. When the amount of methyl methacrylate is less than 10%, the resulting composition becomes poor in transparency. In contrast, utilizing an amount greater than 60%, the resulting composition is not satisfactory in thermal resistance. Acrylonitrile serves to increase the rate of polymerization, but the use of acrylonitrile in an amount exceeding approximately 35% leads to formation of an undesirable color in the resulting vinyl chloride polymer composition. Other copolymerizable monoethylenically unsaturated monomers may be used in general for the purpose of increasing in the rate of polymerization and imparting an improved processability to the resulting vinyl chloride polymer composition. However, the use of such monomers in amounts greater than 10% usually leads to a reduction in thermal resistance and in transparency. Such monomers include, for example, styrene, vinyltoluene, methacrylic acid, methyl acrylate, p-chlorostyrene, maleic anhydride and methacrylonitrile.

A monomer charge of the copolymer (B) may be polymerized either in the absence of or in the presence of a latex of the graft copolymer (A). The polymerization of the monomer charge of copolymer (B) may be carried out in a known manner by using conventional emulsifiers and initiators. A polymerization degree controller such as tert.-dodecyl mercaptan may be incorporated in the monomer charge in an amount of less than 5% by weight. The polymerization temperature is usually from 40° to 150° C. The monomer charge may be introduced into a reactor altogether at one time, at several times or in a continuous manner.

In the case where the monomer charge of copolymer (B) is polymerized in the presence of the latex of graft copolymer (A), the reaction product in the form of a latex is coagulated, washed, dehydrated and then dried and thereby being formed into a white powder, which is used as a modifier for the vinyl chloride polymer.

In the case where the monomer charge of copolymer (B) is polymerized in the absence of graft copolymer (A), the obtained copolymer (B) is blended with graft copolymer (A) both in the form of a latex, and then, the mixture is coagulated, washed and then dried into a white powder for use as a modifier. Alternatively, the obtained copolymer (B) is first made into a white powder, and then, the powder is blended with graft copolymer (A) in the form of a powder by using, for example, a mixing roller or a Banbury mixer, thereby obtaining the intended modifier.

The amounts of graft copolymer (A) and copolymer (B) in the composite elastomer composition should be from 20 to 60% by weight and from 40 to 80% by weight, respectively, based on the weight of the composite elastomer composition. Where the composite elastomer composition contains substantially less than 20% by weight of graft copolymer (A) and correspondingly substantially more than 80% by weight of copolymer (B), the resulting vinyl chloride polymer composition is not satisfactory in impact resistance. Whereas with composite elastomer compositions containing substantially more than 60% by weight of graft copolymer (A) and correspondingly substantially less than 40% by weight of copolymer (B), the resulting vinyl chloride polymer composition is poor in processability and thermal resistance.

The blending of the vinyl chloride polymer with the composite elastomer composition modifier may be carried out in a known manner. Additives such as stabilizer, lubricant, processing aid, pigment, and filler, which are conventionally used for vinyl chloride polymer resins, may be incorporated into the vinyl chloride polymer composition of the invention. The vinyl chloride polymer composition may be made into a variety of shaped articles of using, for example, a mixing roll, a callender roll, an extruder, an injection molding machine and an inflation extruder. The vinyl chloride polymer composition is particularly suitable for shaped articles for which enhanced thermal resistance, transparency, surface luster and impact resistance are desired, such as blow-formed bottles.

The following examples illustrate specific embodiments of the invention. All parts and percentages are by weight unless otherwise specified.

In the following examples the physical properties of the vinyl chloride polymer compositions were determined as follows. The impact resistance is Charpy impact strength as determined at 20° C on a specimen having a size of 5 mm in thickness by 15 mm in width by 90 mm in length and a V-shaped notch cut at 2 mm in depth in the direction of the width. The softening point is Vicat softening point as determined according to ASTM-D-1525 at a load of 1 kg. The surface luster was observed by the naked eye on a sheet specimen prepared by extruding through an extruder of 25 mm in diameter at a die temperature of 200° C, and expressed in five grades numbered 1 through 5 wherein 1 and 5 mean that the surface luster is poor and excellent, respectively. The processing performance was expressed in terms of the flow rate in $10^{-2}$ ml/sec. as determined by using a Koka-type flow tester having a nozzle of 1 mm in diameter and 1 mm in length at a load of 100 kg/cm$^2$ and a temperature of 220° C.

EXAMPLE 1

The purpose of this Example is to illustrate that physical properties of the final composition are influenced by different methods of obtaining graft copolymer (A), and also by incorporation or non-incorporation of copolymer (B) in the final composition.

| 1. Preparation of rubber (R-1) latex | |
|---|---|
| 1,3-Butadiene | 66 parts |
| n-Butyl acrylate | 9 parts |
| Styrene | 25 parts |
| Potassium oleate | 1.0 parts |
| Potassium rosinate | 1.0 parts |
| Diisopropylbenzene hydroperoxide | 0.2 parts |
| Sodium pyrophosphate | 0.5 parts |
| Dextrose | 0.3 parts |
| Ferrous sulfate | 0.005 parts |
| Water to | 200 parts |

A monomer change of the above-mentioned composition was polymerized at 50° C in a 50 liter autoclave. After 9 hours, polymerization was completed for obtaining a rubber (R-1) latex of a pH of 8.9. The rubber particles dispersed in the latex had an average particle size of 0.08 micron and a refractive index of 1.538 at 20° C.

2. Preparation of agglomerated rubber particles R-2

One part (as solid) of a latex of a copolymer comprised of 85% of n-butyl acrylate and 15% of methacrylic acid was incorporated into 100 parts (calculated in terms of solid rubber) of the rubber (R-1) latex followed by stirring for 30 minutes. Thus, the average particle size of the rubber (R-1) was increased to 0.26 micron. Two parts of polyoxyethylene lauryl ether (emulsifier) were added to the treated rubber latex thereby obtaining stabilized rubber (R-2) latex.

| 3-1) Preparation of graft copolymer G-1 | |
|---|---|
| Rubber (R-2) latex (as solid) | 65 parts |
| Styrene | 17.5 parts |

-continued

| 3-1) Preparation of graft copolymer G-1 | |
|---|---|
| Cumene hydroperoxide (in styrene) | 0.07 parts |
| Methyl methacrylate | 17.5 parts |
| Cumene hydroperoxide (in methyl methacrylate) | 0.07 parts |
| Sodium formaldehyde sulfoxylate | 0.10 parts |
| Potassium oleate | 1.0 parts |
| Water to | 200 parts |

A flask flushed with nitrogen was charged with all the above ingredients except for the styrene, methyl methacrylate and cumene hydroperoxide. A mixture of methyl methacrylate and cumene hydroperoxide was added by drops to the contents of the flask at 70° C over a period of one hour, and then, the resultant mixture was further maintained at that temperature for 1 hour. Sequentially, a mixture of styrene and cumene hydroperoxide was similarly added thereto at 70° C over a period of 1 hour and further maintained at that temperature for 3 hours. The conversion was 99.5%.

3-2. Preparation of graft copolymer G-2

Following the procedure taken for the preparation of graft copolymer G-1, graft copolymer G-2 was prepared wherein the styrene was first added to the initial charge by drops at 70° C over a period of 1 hour and then further maintained at that temperature for 3 hours. Sequentially, the methyl methacrylate was similarly added thereto at 70° C over a period of 1 hour and then further maintained at that temperature for 1 hour. All other conditions remained substantially the same. The conversion was 99.8%.

3-3. Preparation of graft copolymer G-3

Following the procedure taken for the preparation of graft copolymer G-1, graft copolymer G-3 was prepared wherein the methyl methacrylate and the styrene were added to the initial charge simultaneously, i.e., as a mixture, at 70° C over a period of 2 hours, and then, further maintained at that temperature for 4 hours.

| 4. Preparation of terpolymer T-1 | |
|---|---|
| Alpha-methylstyrene | 50 parts |
| Methyl methacrylate | 40 parts |
| Acrylonitrile | 10 parts |
| Potassium oleate | 1.0 parts |
| Potassium rosinate | 1.0 parts |
| Potassium persulfate | 0.4 parts |
| Tert.-dodecyl mercaptan | 1.0 parts |
| Water to | 200 parts |

A monomer charge of the above composition was polymerized at 70° C for 8 hours for obtaining latex T-1. The conversion was 98.8%.

5. Preparation of composite elastomer composition

Each of graft copolymer latexes G-1, G-2 and G-3 was blended with terpolymer latex T-1 in a proportion such that the solid matter of the resulting latex mixture contained 30% of rubber R-2. One percent of butylated hydroxytoluene and 0.7% of dilauryl thio-dipropionate were added to the latex mixture. Then, the latex mixture was coagulated by the addition of 4% of aluminum chloride and 1.2% of sulfuric acid, both based upon the weight of the polymers. The mixture was washed and then dried to obtain a white composite elastomer composition in the form of finely divided powders.

| 6. Preparation of graft copolymer G-4 (according to Japanese laid-open application 26953/1976) | |
|---|---|
| Rubber (R-2) latex (calculated in terms of solid content) | 30 parts |
| Alpha-methylstyrene | 35 parts |
| Methyl methacrylate | 28 parts |
| Acrylonitrile | 7 parts |
| Potassium oleate | 1.0 parts |
| Potassium rosinate | 1.0 parts |
| Ammonium persulfate | 0.4 parts |
| Tert.-dodecyl mercaptan | 0.5 parts |

A monomer charge of the above composition was polymerized at 70° C for 7 hours to obtain a latex of graft copolymer G-4. The conversion was 98.5%. One percent of butylated hydroxytoluene and 0.7% of dilauryl thio-dipropionate were added to the latex. Then the latex was coagulated by the addition of 5% of aluminum chloride solution, washed and then dried to obtain finely divided white powders of graft copolymer G-4.

7. Preparation of polyvinyl chloride composition

Each of the blends of terpolymer T-1 with one of graft copolymers G-1, G-2 and G-3 was mixed with polyvinyl chloride having a polymerization degree of 700 at a proportion shown in Table 1. To 100 parts of this mixture, 2.0 parts of dibutyltin maleate, 0.5 part of stearyl alcohol, 1.0 part of butyl stearate and 1.0 part of Metablene P-700 (trade name, a processing aid supplied by Mitsubishi Rayon Co., Japan) were added. The resultant mixture was milled at 175° C by mixing rollers for 6 minutes for forming into a sheet. The sheet was pressed at 185° C and 200 kg/cm² by press-forming for seventeen minutes for obtaining a specimen. The physical properties of the specimen were tested. Results are shown in Table 1.

For comparison purposes, the above procedure was repeated wherein polyvinyl chloride compositions were prepared separately from graft copolymers G-1 through G-4, instead of the blends of terpolymer T-1 with the graft copolymers G-1, G-2 and G-3. The graft copolymers G-1, G-2 and G-3 were finely divided white powders prepared in a manner similar to that found in the preparation of the finely divided white powder of graft copolymer G-4. The test results are shown in Table 1.

Table 1

| Specimen *1 | Graft copolymer | Graft copolymerization procedure *2 | Composition of PVC graft copolymer (%) | Terpolymer (%) | FVC (%) | Impact strength (kg.cm/cm²) | Softening point (° C) | Total luminous transmittance (%) | Surface luster | Processing performance (10⁻²ml/sec) |
|---|---|---|---|---|---|---|---|---|---|---|
| HS-1 | G-1 | ←M←S | 11.5 | 13.5 | 75 | 32.1 | 95.0 | 85.1 | 5 | 48.0 |
| HR-1 | G-2 | ←S←M | 11.5 | 13.5 | 75 | 28.3 | 92.7 | 83.9 | 4 | 13.5 |
| HR-2 | G-3 | ←S.M | 11.5 | 13.5 | 75 | 26.6 | 89.1 | 82.1 | 3 | 33.8 |
| HR-3 | G-4 | ←αMS.M.A | — | — | 75 | 20.0 | 87.6 | 81.4 | 2 | 20.7 |
| HR-4 | — | — | — | — | 100 | 2.3 | 75.3 | 79.8 | 5 | 32.4 |
| HP-5 | G-1 | ←M←S | — | — | 85 | 12.4 | 75.0 | 75.8 | 5 | 32.6 |

Table 1-continued

| Specimen *1 | Graft copolymer | Graft copolymerization procedure *2 | Composition of PVC graft copolymer (%) | Terpolymer (%) | FVC (%) | Impact strength (kg.cm/cm²) | Softening point (° C) | Total luminous transmittance (%) | Surface luster | Processing performance (10⁻²ml/sec) |
|---|---|---|---|---|---|---|---|---|---|---|
| HR-6 | G-2 | ←S←M | — | — | 85 | 12.0 | 74.8 | 73.2 | 5 | 11.1 |
| HR-7 | G-3 | ←S . M | — | — | 85 | 12.2 | 74.5 | 70.8 | 3 | 25.7 |

(Notes)
*1 HS = Example of the invention and HR = Comparative example
*2 Graft copolymerization procedure:

" ←M ←S " means a sequential two-stage polymerization procedure wherein first M is grafted to the rubber substrate and then S is grafted thereto afterwards, " ←S ←M " means a sequential two-stage polymerization procedure wherein S is first grafted to the rubber substrate and then M is afterwards grafted thereto, and " ←M . S " means that M and S are simultaneously grafted to the rubber substrate.

The abbreviations for monomers are as follows: M=Methyl methacrylate, S=styrene, αMS=α-methylstyrene and A=acrylonitrile.

EXAMPLE 2

This example illustrates the effect of the composition of graft monomers in graft copolymer (A).

Following the procedure set forth in item 1 of Example 1, a butadiene rubber latex was prepared. This rubber was comprised of 72% of 1,3-butadiene and 28% of styrene. The particles of said rubber had an average particle size of 0.25 micron and a refractive index of 1.541 at 20° C.

Following the procedure set forth in item 3 of Example 1, 35 parts of methyl methacrylate and styrene were polymerized in the presence of 65 parts (calculated in terms of solid rubber) of the above butadiene rubber latex in a sequential two-stage procedure wherein methyl methacrylate and styrene were added in this order and the proportion of the two monomers was as shown in Table 2, below. The graft copolymer latex so prepared was blended with terpolymer T-1 latex set forth in Example 1 in a proportion such that the solid matter of the resulting blend contained 30% of the butadiene rubber. The latex blend was coagulated, washed and then dried in a manner similar to that in Example 1 to obtain a white composite elastomer composition powder.

Twenty five parts of the white powder were blended with 75 parts of a polyvinyl chloride having a polymerization degree of 700 in a manner similar to that in Example 1. Physical properties of the blend are shown in Table 2.

Table 2

| Specimen | Graft monomer composition (%) | Impact strength (kg cm/cm²) | Softening point (° C) | Total luminous transmittance (%) |
|---|---|---|---|---|
| HR-7 | St/MMA= 80/20 | 19.4 | 92.8 | 73.8 |
| HS-2 | St/MMA= 65/35 | 31.5 | 93.3 | 83.0 |

Table 2-continued

| Specimen | Graft monomer composition (%) | Impact strength (kg cm/cm²) | Softening point (° C) | Total luminous transmittance (%) |
|---|---|---|---|---|
| HS-3 | St/MMA= 50/50 | 32.1 | 93.5 | 85.1 |
| HS-4 | St/MMA= 35/65 | 29.0 | 92.9 | 84.5 |
| HR-8 | St/MMA= 20/80 | 18.6 | 93.1 | 72.1 |

(Notes)
St = styrene, MMA=methyl methacrylate

EXAMPLE 3

This example illustrates the effect of the butadiene rubber content in graft copolymer (A).

Using a butadiene rubber similar to that prepared in Example 2 and following the procedure set forth in Example 2, graft copolymer latexes were prepared wherein the proportion of styrene to methyl methacrylate was 50/50, and the amount of the butadiene rubber was varied as shown in Tble 3, below, thereby to vary the graft proportion. From these graft copolymer latexes and terpolymer T-1 latex, composite elastomer compositions were prepared and blended with a polyvinyl chloride having a polymerization degree of 100 in a manner similar to that in Example 2. Physical properties of the blend are shown in Table 3.

Table 3

| Specimen | Content of rubber (%) | Graft efficiency (%) | Impact strength (kg cm/cm²) | Softening point (° C) | Total luminous transmittance (%) | Surface luster |
|---|---|---|---|---|---|---|
| HR-9 | 90 | 11.1 | 17.6 | 90.0 | 73.0 | 2 |
| HS-5 | 80 | 25.0 | 27.6 | 93.0 | 80.0 | 4 |
| HS-6 | 65 | 53.8 | 32.1 | 93.5 | 85.1 | 5 |
| HS-8 | 55 | 81.8 | 35.0 | 94.0 | 84.4 | 5 |
| HR-10 | 35 | 140 | 25.0 | 81.4 | 83.6 | 4 |

EXAMPLE 4

This example illustrates the effect of the preparation in which graft copolymer (A) is blended with copolymer (B).

Using a butadiene rubber similar to that prepared in Example 2 and following the procedure set forth in Example 1, a graft copolymer latex was prepared wherein the graft copolymerization was effected by a sequential three-stage polymerization procedure. That is, 30% of methyl methacrylate, 50% of styrene and 20% of methyl methacrylate were sequentially graft-polymerized in this order. The proportion of weight of the butadiene rubber to the graft monomers was 65/35. Each graft monomer was added by drops at 70° C over a period of 1 hour. The polymerization mixture was maintained at 70° C for periods of 30 minutes, 2 hours and 30 minutes after, the completion of addition of the graft monomer in the first, second and third stages, respectively. Thus, the total polymerization period was 6 hours.

Following the procedure set forth in item 5 of Example 1, composite elastomer compositions were prepared by blending the above graft copolymer latex with the terpolymer latex T-1 wherein the proportion of the graft copolymer latex to the terpolymer latex T-1 was varied as shown in Table 4, below. The resultant latexes were coagulated and made into white powders in a manner similar to that in Example 1. Twenty five parts of each of the composite elastomer composition powders was blended with 75 parts of a polyvinyl chloride having a polymerization degree of 700 in a manner similar to that in Example 1. Each blend was tested for its physical properties. Results are shown in Table 4.

TABLE 4

| Specimen | Proportion of graft copolymer (wt %) | Impact strength (kg-cm/cm$^2$) | Softening point (° C) | Total luminous transmittance (%) |
| --- | --- | --- | --- | --- |
| HR-11 | 0 | 3.0 | 99.7 | 81.0 |
| HR-12 | 10 | 4.6 | 98.1 | 81.3 |
| HS-8 | 20 | 10.4 | 97.3 | 83.0 |
| HS-9 | 45 | 35.0 | 94.5 | 85.8 |
| HS-10 | 60 | 70.9 | 87.4 | 84.3 |
| HR-13 | 75 | 81.4 | 83.0 | 78.6 |

EXAMPLE 5

This example illustrates the effect of the particle size of the butadiene rubber.

Following the procedure set forth in item 1 of Example 1, a butadiene rubber latex was prepared. This rubber latex had a pH of 9.4 and the solid content was comprised of 63% of 1,3-butadiene, 27% of styrene and 10% of n-butyl acrylate. The particles of said rubber had an average particle size of 0.07 micron and a refractive index of 1.536 at 20° C. This rubber latex was treated with a latex of a copolymer comprised of 85% of n-butyl acrylate and 15% of methacrylic acid in a manner similar to that set forth in item 2 of Example 1 wherein the proportion of the two latexes was varied, thereby preparing a variety of latexes having agglomerated rubber particles. The average particle sizes of these agglomerated rubber particles were as shown in Table 5, below.

Following the procedure set forth in Example 4, graft copolymer latexes were prepared by a similar sequential three-stage polymerization procedure wherein the proportion by weight of the butadiene rubber to the graft monomers was 30/16.

Fifty-four parts of a monomer charge having the composition shown in item 4, of Example 1, was incorporated in 46 parts (calculated in terms of solid copolymer) of each of the above-mentioned graft copolymer latexes and said monomer charge was polymerized at 70° C for a period of 9 hours. The final conversion ws 98.0%. Thirty parts of the graft copolymer so prepared was blended with 70 parts of polyvinyl chloride having a polymerization degree of 800 in a manner similar to that in Example 1. The blend was tested for its physical properties. Results are shown in Table 5.

Table 5

| Specimen | Amount of n-BA/MA copolymer *1 (%) | Average particle size of rubber (micron) | Impact strength (kg-cm/cm$^2$) | Softening point (° C) | Total luminous transmittance (%) |
| --- | --- | --- | --- | --- | --- |
| HR-14 | 0 | 0.070 | 5.0 | 95.0 | 84.7 |
| HS-11 | 0.10 | 0.110 | 9.8 | 95.0 | 84.5 |
| HS-12 | 0.45 | 0.18 | 25.4 | 95.4 | 84.0 |
| HS-13 | 1.0 | 0.25 | 32.5 | 95.5 | 83.5 |
| HS-14 | 1.7 | 0.30 | 36.0 | 95.3 | 80.1 |
| HR-15 | 2.5 | 0.35 | 38.5 | 95.3 | 66.7 |

(Notes)
*1 Amount of the n-butyl acrylate/methacrylic acid copolymer latex added to the butadiene rubber latex, in % by weight (as solid) based on the weight of the solid content in the butadiene rubber latex.

EXAMPLE 6

This example illustrates the effect of the refractive index of the butadiene rubber.

Following the procedure set forth in item 1, of Example 1, various butadiene rubber latexes each having an average particle size of 0.23 micron were prepared wherein the composition of the butadiene rubber was varied thereby obtaining different refractive indexes as shown in Table 6.

Using each of the butadiene rubber latexes so prepared and following the procedure set forth in Example 4, a graft copolymer latex was prepared wherein 20% of methyl methacrylate, 50% of styrene and 30% of methyl methacrylate were sequentially graft-polymerized in this order. The graft copolymer latex so prepared was coagulated to obtain a white powder.

Forty-six parts of the above-mentioned graft copolymer powder was blended with 54 parts of terpolymer (T-1) powder similar to that prepared in Example 1, thereby obtaining a composite elastomer composition containing 30% of the butadiene rubber. Twenty-five parts of this composite elastomer composition was blended with 75 parts of polyvinyl chloride having a polymerization degree of 1,000. The blend was tested for its physical properties. Results are shown in Table 6.

Table 6

| Specimen | Composition of butadiene rubber | Refractive index of butadiene rubber (20° C) | Impact strength (kg-cm/cm$^2$) | Softening point (° C) | Transparency Total luminous transmittance (%) | Haze (%) |
| --- | --- | --- | --- | --- | --- | --- |
| HR-16 | PBd | 1.520 | 25.0 | 94.4 | 60.0 | 39.4 |
| HR-17 | Bd/St/Ba= 60/22/18 | 1.528 | 30.7 | 95.5 | 68.4 | 34.4 |
| HS-15 | Bd/St/Ba= 70/23/7 | 1.534 | 31.4 | 95.8 | 82.4 | 10.1 |
| HS-16 | Bd/St= 69/31 | 1.543 | 32.5 | 95.3 | 85.0 | 7.3 |

Table 6-continued

| Specimen | Composition of butadiene rubber | Refractive index of butadiene rubber (20° C) | Impact strength (kg-cm/cm²) | Softening point (° C) | Transparency Total luminous transmittance (%) | Haze (%) |
| --- | --- | --- | --- | --- | --- | --- |
| HS-17 | Bd/St/Ba=50/40/10 | 1.545 | 32.2 | 95.3 | 83.3 | 10.2 |
| HS-18 | Bd/St/MMA=50/43/7 | 1.550 | 31.4 | 95.9 | 78.8 | 15.2 |
| HR-18 | Rd/St=50/50 | 1.558 | 27.3 | 94.4 | 74.4 | 26.6 |

(Notes)
PBd = polybutadiene, St = styrene, MMA = methyl methacrylate,
Bd = butadiene and BA = n-butyl acrylate

EXAMPLE 7

This example illustrates the effect of the composition of copolymer (B).

Using the butadiene rubber (R-2) latex used in Example 1 and following the procedure set forth in Example 4, a graft copolymer latex was prepared by a similar sequential three-stage polymerization procedure.

Sixty parts of a monomer charge consisting of α-methylstyrene, methyl methacrylate and acrylonitrile were polymerized in the presence of 40 parts (calculated in terms of solid copolymer) of the above-mentioned graft copolymer latex by using 0.6 part of t.-dodecyl mercaptan in a manner similar to that set forth in Example 5. The proportion of α-methylstyrene, methyl methacrylate and acrylonitrile was as shown in Table 7, below. Twenty-five parts of the graft copolymer so prepared was blended with 75 parts of a polyvinyl chloride having a polymerization degree of 800 in a manner similar to that in Example 1. The blend was tested for its physical properties. Results are shown in Table 7.

Table 7

| Specimen | Composition of copolymer (B) (%) | Polymerization period* (hours) | Impact strength (kg-cm/cm²) | Softening point (° C) | Total luminous transmittance (%) |
| --- | --- | --- | --- | --- | --- |
| HS-19 | αMS/MMA/AN=46/24/30 | 4.5 | 32.4 | 93.0 | 78.6 |
| HS-20 | αMS/MMA/AN=56/20/24 | 5.5 | 29.0 | 96.2 | 84.0 |
| HS-21 | αMS/MMA/A=60/12.5/27.5 | 6.5 | 35.4 | 95.0 | 83.7 |
| HS-22 | αMS/MMA/AN=55/20/15 | 9.0 | 28.7 | 98.0 | 81.9 |
| HS-23 | αMS/MMA/St-/AN=50/30/5/15 | 8.0 | 31.8 | 94.3 | 84.0 |
| HS-24 | αMS/MMA/AN=35/60/5 | 4.5 | 33.5 | 92.5 | 80.9 |
| HR-19 | αMS/MMA/AN=37/43/20 | 3.0 | 28.4 | 84.4 | 64.9 |
| HR-20 | αMS/MMA/AN=67/23/10 | 16.5 | 25.0 | 97.0 | 73.8 |
| HR-21 | αMS/MMA/AN=70/0/30 | 5.0 | 15.8 | 88.4 | 70.0 |
| HR-22 | αMS/MMA/AN=50/5/45 | 3.5 | 20.1 | 88.8 | 67.9 |
| HR-23 | αMS/MMA=55/45 | >40 | — | — | — |

(Notes)
*The time period of polymerization required for the conversion of 95%.
αMS = α-methylstyrene and AN = acrylonitrile

EXAMPLE 8

This example illustrates the effect of the proportion in which a vinyl chloride polymer and the composite elastomer composition are blended with each other.

Using the butadiene rubber (R-2) latex used in Example 1 and following the procedure set forth in Example 4, a graft copolymer latex was prepared by a similar sequential three-stage polymerization procedure. The graft copolymer latex so prepared was blended with terpolymer (T-1) latex in a proportion such that the resulting latex mixture contained 30% (calculated in terms of solid) of rubber R-2. The latex mixture was coagulated and made into a white powder in a manner similar to that in Example 1.

The white powder of the composite elastomer composition was blended with a polyvinyl chloride having a polymerization degree of 700 in a manner similar to that in Example 1, wherein the blending proportion was varied as shown in Table 8. Each blend was tested for its physical properties. Results are shown in Table 8.

Table 8

| Specimen | Amount of PVc (%) | Amount of composite elastomer composition (%) | Impact strength (kg-cm/cm²) | Softening point (° C) | Total luminous transmittance (%) |
| --- | --- | --- | --- | --- | --- |
| HR-24 | 100 | 0 | 2.3 | 79.0 | 79.8 |
| HR-25 | 90 | 10 | 21.4 | 82.4 | 80.8 |
| HS-25 | 85 | 15 | 33.0 | 87.9 | 83.3 |
| HS-26 | 75 | 25 | 35.0 | 94.5 | 85.8 |
| HR-26 | 45 | 55 | 46.3 | 108.2 | 72.4 |
| HR-27 | 30 | 70 | 21.1 | 125.4 | 56.4 |
| HR-28 | 0 | 100 | 10.4 | 132.5 | 80.5 |

EXAMPLE 9

Following the procedure for the preparation of specimen HS-1 set forth in Example 1, a modified vinyl chloride polymer composition (HS-27) was prepared wherein a copolymer comprised of 90% of vinyl chloride and 10% of vinyl acetate and having a polymerization degree of 800 was used instead of the polyvinyl chloride. Physical properties of the resulting composition were as follows.

Impact strength; 31.8 kg.cm/cm$^2$
Softening point; 94.0° C
Total luminous transmittance; 85.2%

What we claim is:

1. A thermoplastic vinyl chloride polymer composition comprising a blend of:
  I. 61 to 85 parts by weight of polyvinyl chloride and/or a copolymer comprised of no less than 80% by weight of vinyl chloride and no more than 20% by weight of at least one other copolymerizable monoethylenically unsaturated monomer, and;
  II. 15 to 39 parts by weight of a composite elastomer composition consisting essentially of:
    A. 20 to 60% by weight, based on the weight of the composite elastomer composition, of a graft copolymer consisting of (a) 15 to 45% by weight of graft monomers consisting of 30 to 70% by weight of methyl methacrylate and 30 to 70% by weight of styrene and (b) 55 to 85% by weight of a butadiene rubber, said graft copolymer being prepared by a sequential polymerization procedure of at least two stages, wherein during the first stage at least part of the methyl methacrylate is polymerized in the presence of a latex of said butadiene rubber, said butadiene rubber particles dispersed therein having an average particle size of 0.10 to 0.30 micron and a refractive index of 1.530 to 1.550 was determined at 20° C, and then, in a subsequent sequential stage or stages, which can be carried out in any order, the first polymerizate is separately polymerized with styrene and separately polymerized with the remainder of the methyl methacrylate, if any, and
    B. 40 to 80% by weight, based on the weight of the composite elastomer composition, of a copolymer consisting of 35 to 65% by weight of α-methylstyrene, 10 to 60% by weight of methyl methacrylate, 5 to 35% by weight of acrylonitrile and 0 to 10% by weight of at least one other copolymerizable monoethylenically unsaturated monomer.

2. A thermoplastic vinyl chloride polymer composition according to claim 1 wherein said butadiene rubber consists essentially of at least 50% by weight of butadiene and at most 50% by weight of at least one copolymerizable monoethylenically unsaturated monomer.

3. A thermoplastic vinyl chloride polymer composition according to claim 1 wherein said butadiene rubber consists essentially of 50 to 80% by weight of butadiene, 16 to 46% by weight of styrene and 4 to 23% by weight of n-butyl acrylate.

4. A thermoplastic vinyl chloride polymer composition according to claim 1 wherein said butadiene rubber particles have an average particle size of 0.15 to 0.25 micron.

5. A thermoplastic vinyl chloride polymer composition according to claim 1 wherein said graft copolymer (A) is prepared by the sequential two-stage polymerization procedure wherein the methyl methacrylate is first polymerized and the styrene sequentially is polymerized.

6. A thermoplastic vinyl chloride polymer composition according to claim 1 wherein said graft copolymer (A) is prepared by the sequential three-stage polymerization procedure wherein a part of the methyl methacrylate, the styrene and then the remainder of the methyl methacrylate are sequentially polymerized.

* * * * *